(12) United States Patent
Guo et al.

(10) Patent No.: US 12,360,987 B2
(45) Date of Patent: Jul. 15, 2025

(54) DATA ATTRIBUTE RETRIEVAL

(71) Applicant: Capital One Services, LLC, McLean, VA (US)

(72) Inventors: Hong Guo, Glen Allen, VA (US); Dhanveer Singh, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/481,504

(22) Filed: Oct. 5, 2023

(65) Prior Publication Data
US 2025/0117379 A1    Apr. 10, 2025

(51) Int. Cl.
*G06F 16/242*    (2019.01)
*G06F 16/22*     (2019.01)

(52) U.S. Cl.
CPC ...... *G06F 16/2425* (2019.01); *G06F 16/2246* (2019.01)

(58) Field of Classification Search
None
See application file for complete search history.

(56) References Cited

U.S. PATENT DOCUMENTS

| 11,501,240 B2 | 11/2022 | Gardner et al. |
| 2006/0074858 A1* | 4/2006 | Etzold ............... G06F 16/24535 |
| 2022/0075793 A1 | 3/2022 | Jezewski |
| 2022/0164349 A1* | 5/2022 | Safaie .................. G06F 16/283 |

OTHER PUBLICATIONS

International Search Report and Written Opinion for Application No. PCT/US2024/049753, mailed on Dec. 11, 2024, 8 pages.
Salton, G., "Manipulation of Trees in Information Retrieval", ARXIV:2003.08934V1, United States, vol. 5(2), Feb. 1, 1962, pp. 103-114, XP058399998, DOI: 10.1145/366792.366828.

* cited by examiner

*Primary Examiner* — Kannan Shanmugasundaram
(74) *Attorney, Agent, or Firm* — Harrity & Harrity, LLP (57) ABSTRACT

In some implementations, a device may receive a request to obtain a set of data attributes. The device may generate one or more hierarchical lists for respective data attributes included in the set of data attributes. The device may identify an anchor hierarchical list, from the one or more hierarchical lists, that is associated with a highest order among the one or more hierarchical lists. The device may generate a first query to a first data source indicated by a first data attribute in a top position of the anchor hierarchical list, wherein the first query requests a first one or more data attributes including the first data attribute and any other data attributes, associated with the first data source, that are in top positions of respective hierarchical lists of the one or more hierarchical lists. The device may transmit, to the first data source, the first query.

20 Claims, 8 Drawing Sheets

DATA ATTRIBUTE RETRIEVAL

BACKGROUND

In modern information systems, the retrieval of data attributes from different data sources through queries may be part of a data retrieval process for extracting valuable insights from the data. The data retrieval process may involve the formulation of structured queries tailored to the specific schema and characteristics of a given data source. The queries may be transmitted to respective data sources. The data sources may include relational databases, graph databases, application programming interfaces (APIs), and/or structured repositories, among other examples. The data retrieval process may rely on the translation of these queries into optimized execution plans by query processors, which leverage indexing, caching, and optimization techniques to efficiently retrieve and assemble the required attributes. The data retrieval process may be associated with one or more challenges, such as heterogeneity in data formats, distribution across multiple sources, and/or query performance optimization, among other examples.

SUMMARY

Some implementations described herein relate to a system for data attribute retrieval. The system may include one or more memories and one or more processors communicatively coupled to the one or more memories. The one or more processors may be configured to receive a request to obtain a set of data attributes. The one or more processors may be configured to generate dependency trees for respective data attributes included in the set of data attributes, wherein the dependency trees indicate ordered lists of one or more dependent data attributes for the respective data attributes. The one or more processors may be configured to identify an anchor dependency tree from the dependency trees, wherein the anchor dependency tree is associated with a longest length among the dependency trees. The one or more processors may be configured to generate, via a set of iterations, queries to respective data sources based on the dependency trees, wherein the respective data sources are indicated via current leaf nodes of the anchor dependency tree in respective iterations of the set of iterations, and wherein each iteration of the set of iterations includes removing data attributes from the dependency trees that have been indicated in prior queries. The one or more processors may be configured to retrieve, via the respective data sources and based on executing the queries, the set of data attributes. The one or more processors may be configured to provide, in response to receiving the request, the set of data attributes.

Some implementations described herein relate to a method of data attribute retrieval. The method may include receiving, by a device, a request to obtain a set of data attributes. The method may include generating, by the device, one or more hierarchical lists for respective data attributes included in the set of data attributes, wherein the one or more hierarchical lists are based on dependencies associated with the set of data attributes. The method may include identifying, by the device, an anchor hierarchical list, from the one or more hierarchical lists, that is associated with a highest order among the one or more hierarchical lists. The method may include generating, by the device, a first query to a first data source indicated by a first data attribute in a top position of the anchor hierarchical list, wherein the first query requests a first one or more data attributes including the first data attribute and any other data attributes, associated with the first data source, that are in top positions of respective hierarchical lists of the one or more hierarchical lists. The method may include removing, by the device, the first one or more data attributes from the one or more hierarchical lists. The method may include transmitting, by the device and to the first data source, the first query.

Some implementations described herein relate to a non-transitory computer-readable medium that stores a set of instructions. The set of instructions, when executed by one or more processors of a device, may cause the device to receive a request to obtain a set of data attributes. The set of instructions, when executed by one or more processors of the device, may cause the device to generate one or more hierarchical lists for respective data attributes included in the set of data attributes. The set of instructions, when executed by one or more processors of the device, may cause the device to identify an anchor hierarchical list, from the one or more hierarchical lists, that is associated with a highest order among the one or more hierarchical lists. The set of instructions, when executed by one or more processors of the device, may cause the device to generate a first query to a first data source indicated by a first data attribute in a top position of the anchor hierarchical list, wherein the first query requests a first one or more data attributes including the first data attribute and any other data attributes, associated with the first data source, that are in top positions of respective hierarchical lists of the one or more hierarchical lists. The set of instructions, when executed by one or more processors of the device, may cause the device to remove the first one or more data attributes from the one or more hierarchical lists. The set of instructions, when executed by one or more processors of the device, may cause the device to transmit, to the first data source, the first query.

DETAILED DESCRIPTION

The following detailed description of example implementations refers to the accompanying drawings. The same reference numbers in different drawings may identify the same or similar elements.

A data attribute may be a descriptor for a data point or a data object. For example, a data attribute may describe other data. A data attribute may be a single value descriptor for a data point or a data object. In some implementations, a data attribute may be associated with using one part of data to describe other parts of the data. A data attribute may be a date (e.g., a given year, month, and/or date), text (e.g., a string of a combination of letters, numbers, and/or other symbols), and/or a Boolean expression (e.g., for binary data), among other examples. In some implementations, a data attribute may be a data field that represents a characteristic or feature of a data object. For example, for customer data, an attribute may include a customer identifier, an address, and/or a phone number, among other examples. In some implementations, a data attribute may be a data attribute defined for a programming language associated with a database or a data repository. As an example, a data attribute may be defined using a syntax or format associated with a programming language used to obtain, manipulate, create, and/or delete data in a data repository associated with the decisioning platform.

In some examples, a data attribute may be associated one or more dependencies. A data attribute dependency may indicate data that is needed to determine, generate, and/or obtain other data. For example, a data dependency for a data attribute may indicate a data input associated with determining, generating, and/or obtaining data described by the data attribute. A data retrieval device may receive a request to obtain one or more data attributes. The data retrieval device may determine one or more dependent data attributes associated with the requested data attribute(s). The data retrieval device may retrieve the one or more dependent data attributes (e.g., by transmitting requests or calls to respective data sources at which the one or more dependent data attributes are stored). After obtaining all of the dependent data attributes, the data retrieval device may retrieve the requested data attribute(s). However, generating and transmitting queries by simply following an order or list of dependencies for each requested data attribute may result in duplicative communications or calls to data sources.

For example, the data retrieval device may generate, for each requested data attribute, a dependency tree. A dependency tree may indicate how data attributes are related to each other based on the data attributes functional dependencies, calculations, and/or other associations. The data retrieval device may follow the order of each dependency tree to generate communications (e.g., application programming interface (API) calls) to data sources. However, this may result in multiple and/or duplicative communications to a given data source. This may result in increased latency and may consume processing resources, computing resources, and/or network resources for retrieving the requested data attribute(s) because of the multiple and/or duplicative communications.

Some implementations described herein enable optimized data attribute retrieval. In some implementations, the data retrieval device may generate, for a given iteration of retrieving requested data attributes, a query to a data source associated with a leaf node (e.g., a node that does not have any outgoing edges, such as a data attribute that is not derived from or dependent on any other attributes) of a dependency tree having a longest length (e.g., the dependency tree having the highest quantity of layers or highest quantity of edges) among the dependency trees associated with respective requested data attributes. The query may be for the data attribute indicated by the current leaf node and for any other data attributes that are also associated with the data source as indicated by leaf nodes of other dependency trees. The data retrieval device may repeat this process, using the current leaf node of the dependency tree having the longest length as an indicator of the data source to which the query for that iteration is to be associated with.

As a result, the data retrieval operation for a set of requested data attributes may be optimized. For example, by using the current leaf node of the dependency tree having the longest length as an indicator of the data source to which the query for that iteration is to be associated with, the data retrieval device may reduce a likelihood of multiple or duplicative communications and/or API calls to the same data source. Additionally, by using the current leaf node of the dependency tree having the longest length as an indicator of the data source to which the query for that iteration is to be associated with, the data retrieval device may reduce a quantity of communications and/or API calls associated with retrieving the set of requested data attributes. This may reduce latency and/or conserve processing resources, computing resources, and/or network resources associated with the data retrieval operation for the set of requested data attributes.

FIGS. 1A-1E are diagrams of an example 100 associated with data attribute retrieval. As shown in FIGS. 1A-1E, example 100 includes a data retrieval device, a data requesting device, and one or more data sources. These devices are described in more detail in connection with FIGS. 2 and 3.

Figure 1A:
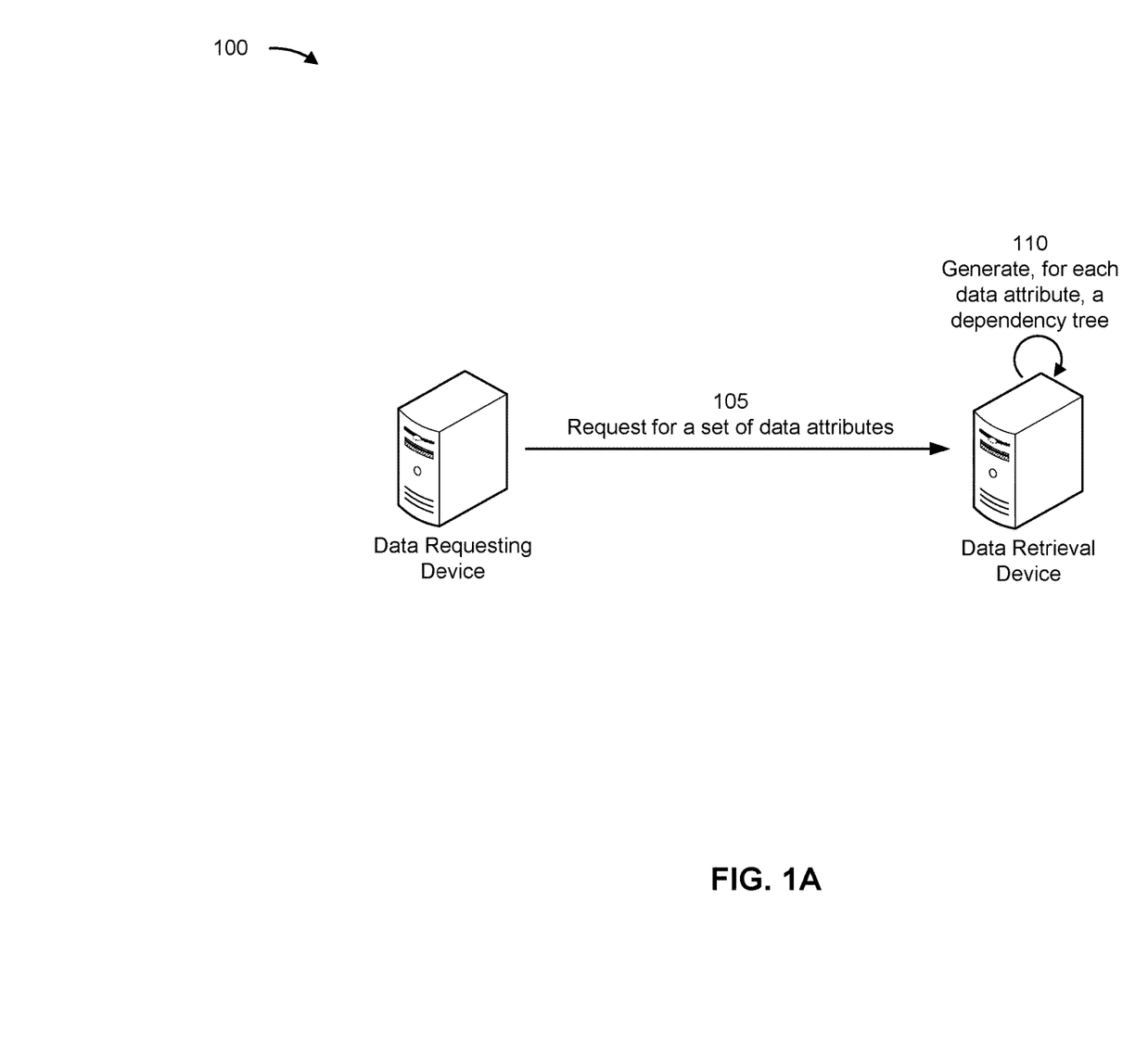
FIGS. 1A-1E are diagrams of an example associated with data attribute retrieval, in accordance with some embodiments of the present disclosure.

In some implementations, the data retrieval device and the data requesting device may be associated with the same device and/or system (e.g., the data retrieval device and the data requesting device may be different components of the same device and/or the same system). For example, the data requesting device may be associated with a first component of an application and the data retrieval device may be associated with a second component of the application. In other implementations, the data retrieval device and the data requesting device may be associated with different devices and/or different systems.

As shown in FIG. 1A, and by reference number 105, the data requesting device may transmit or provide, and the data retrieval device may receive or obtain, a request to obtain a set of data attributes. For example, the request may indicate the set of data attributes (e.g., one or more data attributes). In some implementations, the set of data attributes may include a plurality of data attributes. In some implementations, the data retrieval device may receive the request via an API call, an inter-process communication, and/or another type of communication.

As described elsewhere herein, a data attribute may be a descriptor for a data point or a data object. A data attribute may also be referred to simply as an attribute. A data attribute may describe a characteristic or property of a data entity. For example, in the context of databases and/or data modeling, a data attribute may correspond to a column or field in a table that stores specific types of data (e.g., that are described or indicated by the data attribute). For example, a request for a data attribute may refer to a request for data that is described or indicated by the data attribute. Additionally, obtaining or retrieving a data attribute may refer to obtaining or retrieving data that is described or indicated by the data attribute. For example, a data attribute may be "credit score" and the request for the data attribute may be a request for the data retrieval device to retrieve and/or return a credit score for a particular individual.

In some implementations, the request may indicate information associated with the set of data attributes. For example, the request may indicate one or more known values and/or known information. As an example, the one or more known values and/or known information may include information associated with a user, an account, and/or other known information. As an example, the request may indicate a user's name, an account identifier, an address, personal identifiable information (e.g., a social security number or information indicative of a specific person), a card number (e.g., a credit card number), and/or other known information. For example, the request may indicate the set of data attributes and information to identify particular data (e.g., described by the set of data attributes) that is requested. In some implementations, the information associated with the set of data attributes may be used an in input to one or more data sources to obtain one or more data attributes. For example, a data source may be a storage location of a given data attribute.

As shown by reference number 110, the data retrieval device may generate, for each data attribute (e.g., included in the set of data attributes), a dependency tree. The dependency tree may be a hierarchical representation of relationships and dependencies between different data attributes. For example, the dependency trees may indicate ordered lists of one or more dependent data attributes for the respective data attributes. In some implementations, a dependency tree may include a hierarchical list of data attributes. A dependency tree may be based on dependencies associated with the set of data attributes. For example, a given data attribute may be associated with one or more data dependencies. A data dependency, for a given data attribute, may indicate one or more data attributes that are needed to determine, generate, and/or obtain the given data attribute. For example, a data dependency for a data attribute may indicate a data input associated with determining, generating, and/or obtaining data described by the data attribute.

In some implementations, the data retrieval device may store an indication of one or more data dependencies for respective data attributes. For example, the data retrieval device may store data structures associated with respective data attributes. A data structure associated with a given data attribute may indicate an identifier of the data attribute, a data source from which the data attribute can be obtained, and an indication of one or more dependent data attributes (e.g., that are needed to determine, generate, and/or obtain the data attribute). For example, the data retrieval device may obtain data structures for respective data attributes from the set of data attributes (e.g., indicated by the request). For a given data attribute, the data retrieval device may generate a dependency tree having the given data attribute as a root node of the dependency tree (e.g., having a bottom position in a hierarchical list associated with the given data attribute). The data retrieval device may determine one or more dependent data attributes (e.g., indicated by the data structure associated with the given data attribute). The data retrieval device may add the one or more dependent data attributes as nodes in the dependency tree. For example, the data retrieval device may generate edges between the root node (e.g., associated with the given data attribute) and respective nodes corresponding to dependent data attributes.

For each dependent data attribute, the data retrieval device may determine one or more dependent data attributes (e.g., indicated by the data structure associated with that dependent data attribute). The data retrieval device may add the one or more dependent data attributes as nodes in the dependency tree (e.g., in a similar manner as described above). For example, a dependency tree for a given requested data attribute may include a set of nodes corresponding to respective data attributes. The dependency tree may include a root node corresponding to the requested data attribute. The dependency tree may include edges between nodes indicating the dependencies between data attributes. The edges may indicate how one attribute relies on another data attribute for a value or computation. The edges may be labeled with a type of dependency, such as a calculation dependency, a referential dependency, an aggregation dependency, and/or another type of dependency.

Figure 1B:
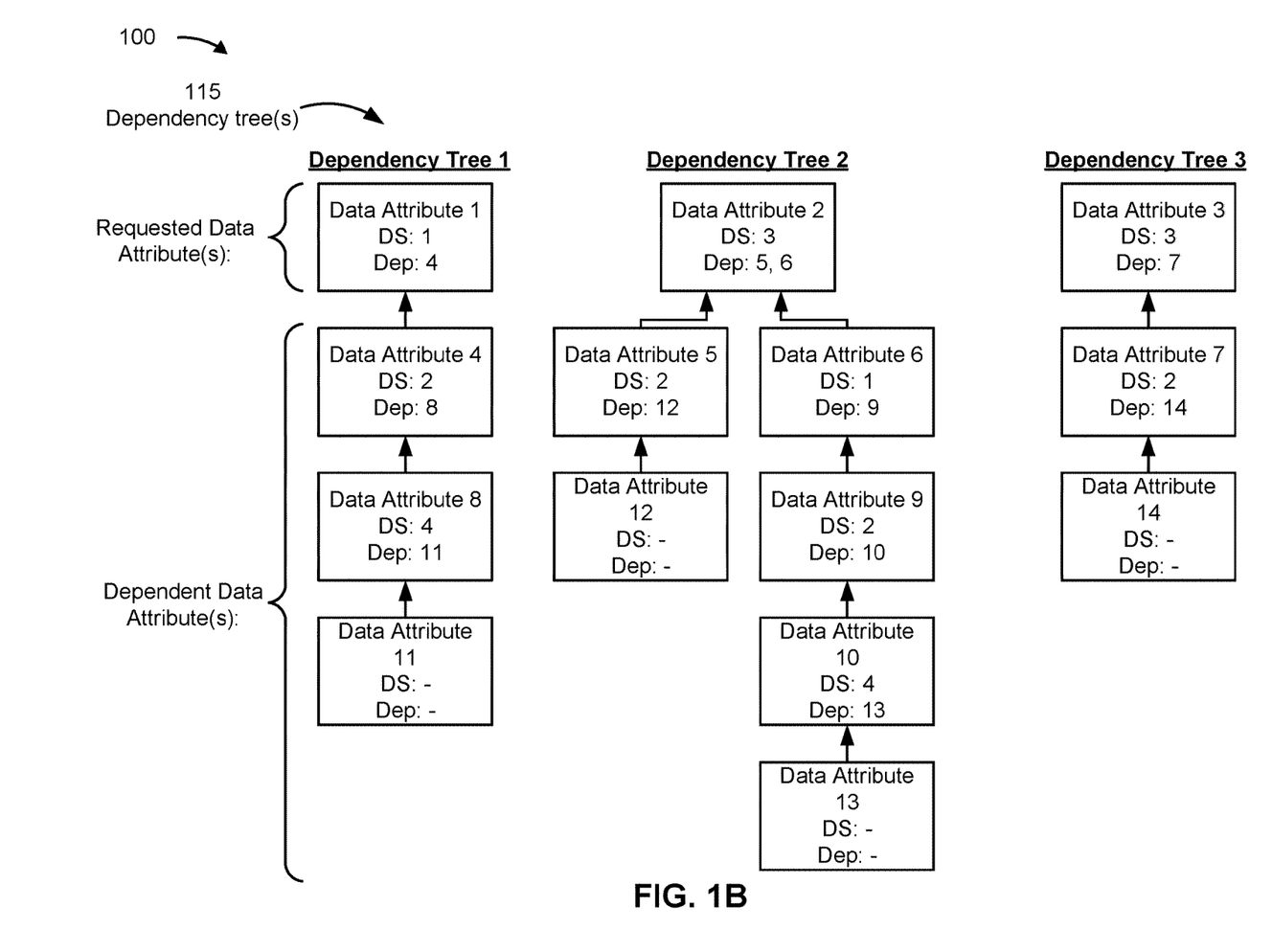

For example, as shown in FIG. 1B, the request may indicate a data attribute 1, a data attribute 2, and a data attribute 3. As shown by reference number 115, the data retrieval device may generate dependency trees for each requested data attribute (e.g., a dependency tree 1 associated with the data attribute 1, a dependency tree 2 associated with the data attribute 2, and a dependency tree 3 associated with the data attribute 3).

As shown in FIG. 1B, the data attribute 1 may be a root node of the dependency tree 1. In other words, the data attribute 1 may be in the bottom position of a hierarchical list associated with the dependency tree 1. The dependency tree 1 may include an edge between the data attribute 1 and a data attribute 4. For example, the data structure associated with the data attribute 1 may indicate that, to obtain the data attribute 1, the data attribute 4 is needed. The dependency tree 1 may include an edge between the data attribute 4 and a data attribute 8. For example, the data structure associated with the data attribute 4 may indicate that, to obtain the data attribute 4, the data attribute 8 is needed. Similarly, the dependency tree 1 may include an edge between the data attribute 8 and a data attribute 11. For example, the data structure associated with the data attribute 8 may indicate that, to obtain the data attribute 4, the data attribute 11 is needed. As shown in FIG. 1B, the data attribute 11 may not have any dependencies. For example, the data attribute 11 may be a known value (e.g., indicated by the request or obtainable by the data retrieval device).

A leaf node of the dependency tree 1 may be associated with the data attribute 8. In other words, the data attribute 8 may be in the top position of the hierarchical list associated with the dependency tree 1. The leaf node and/or the top position may refer to the first data attribute for which a request needs to be made to a data source to obtain the data attribute (e.g., because the data attribute 11 is obtainable without communicating with a data source, the data attribute 11 is not the leaf node and/or in the top position). After the data retrieval device obtains the data attribute 8, the data attribute 4 will be the leaf node and/or in the top position of the dependency tree 1.

As shown in FIG. 1B, the data attribute 2 may be a root node of the dependency tree 2. The dependency tree 2 may include an edge between the data attribute 2 and a data attribute 5 and an edge between the data attribute 2 and a data attribute 6. For example, the data structure associated with the data attribute 2 may indicate that, to obtain the data attribute 2, both the data attribute 5 and the data attribute 6 are needed. The dependency tree 2 may include an edge between the data attribute 5 and a data attribute 12. For example, the data structure associated with the data attribute 5 may indicate that, to obtain the data attribute 5, the data attribute 12 is needed. Similarly, the dependency tree 2 may include an edge between the data attribute 6 and a data attribute 9. For example, the data structure associated with the data attribute 6 may indicate that, to obtain the data attribute 6, the data attribute 9 is needed. Additionally, the dependency tree 2 may include an edge between the data attribute 9 and a data attribute 10. For example, the data structure associated with the data attribute 9 may indicate that, to obtain the data attribute 9, the data attribute 10 is needed. The dependency tree 2 may include an edge between the data attribute 10 and a data attribute 13. For example, the data structure associated with the data attribute 10 may indicate that, to obtain the data attribute 10, the data attribute 13 is needed.

A leaf node of the dependency tree 2 may be associated with the data attribute 10. In other words, the data attribute 10 may be in the top position of the hierarchical list associated with the dependency tree 2. For example, where a dependency tree includes multiple branches, the leaf node may be the node that is the highest quantity of edges away from the root node. For example, as shown in FIG. 1B, the data attribute 5 may be one edge away from the root node and the data attribute 10 may be three edges away from the root node. Therefore, the data attribute 10 may be current leaf node of the dependency tree 2.

As shown in FIG. 1B, the data attribute 3 may be a root node of the dependency tree 3. In other words, the data attribute 3 may be in the bottom position of a hierarchical list associated with the dependency tree 3. The dependency tree 3 may include an edge between the data attribute 3 and a data attribute 7. For example, the data structure associated with the data attribute 3 may indicate that, to obtain the data attribute 3, the data attribute 7 is needed. The dependency tree 3 may include an edge between the data attribute 7 and a data attribute 14. For example, the data structure associated with the data attribute 7 may indicate that, to obtain the data attribute 7, the data attribute 14 is needed. A leaf node of the dependency tree 3 may be associated with the data attribute 7. In other words, the data attribute 7 may be in the top position of the hierarchical list associated with the dependency tree 3.

The data retrieval device may store the dependency trees via an ordered sequence of operations or layers involved in the data retrieval process for respective data attributes. The ordered sequence of operations or layers may be referred to as a "data retrieval stack" or a "stack." For example, a stack may include elements corresponding to respective data attributes and/or nodes in a dependency tree associated with the stack. The bottom of the stack may be associated with an operation associated with obtaining the data attribute indicated by the root node of the dependency tree (e.g., a last operation in the ordered sequence of operations or layers may be to obtain the data attribute indicated by the root node). A top of the of the stack may be associated with an operation associated with obtaining the data attribute indicated by the leaf node of the dependency tree (e.g., a first operation in the ordered sequence of operations or layers may be to obtain the data attribute indicated by the leaf node).

Figure 1C:
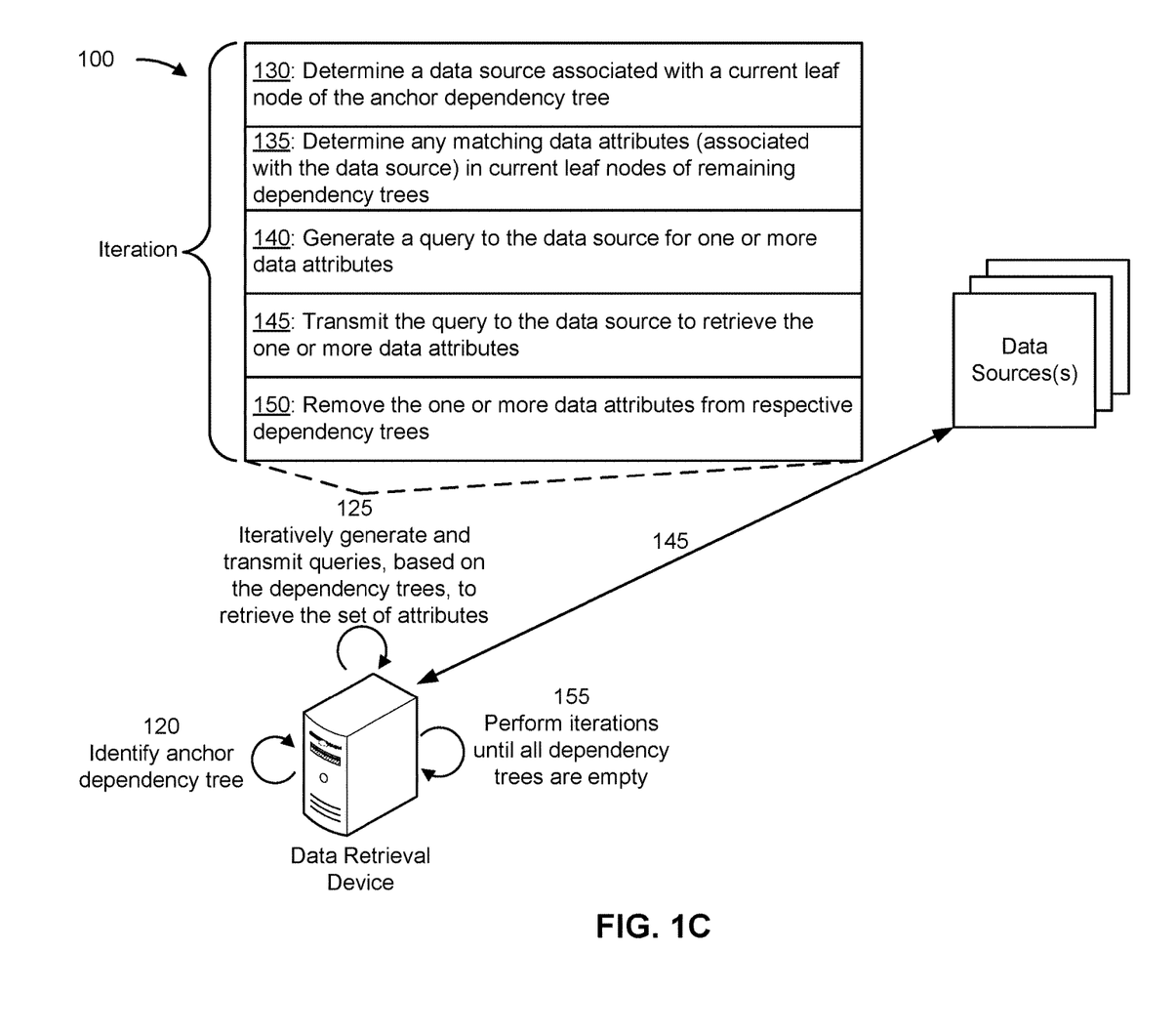

As shown in FIG. 1C, and by reference number 120, the data retrieval device may identify an anchor dependency tree. For example, the data retrieval device may identify the anchor dependency tree based on comparing lengths of the dependency trees associated with the set of data attributes. A "length" of a dependency tree may refer to a quantity of edges needed to pass from a leaf node of the dependency tree to the root node of the dependency tree. The length of the dependency tree may also be referred to as a height or an order of the dependency tree. In some implementations, the length of a dependency tree may be based on a quantity of nodes included in the dependency tree, a quantity of layers included in the dependency tree, and/or a quantity of edges included in the dependency tree, among other examples.

For example, the anchor dependency tree may be associated with a longest length among the dependency trees for the set of data attributes. In other words, the anchor dependency tree may be the dependency tree, from the set of dependency trees, that has a longest length, a greatest height, and/or a greatest quantity of edges between a leaf node and a root node.

As an example, using the example depicted in FIG. 1B, the data retrieval device may identify that the anchor dependency tree is the dependency tree 2. For example, the dependency tree 1 may have a length of two (e.g., two edges between the leaf node and the root node), the dependency tree 2 may have a length of three, and the dependency tree 3 may have a length of one. Therefore, because the dependency tree 2 has a greatest length, the data retrieval device may identify that the anchor dependency tree is the dependency tree 2.

In some implementations, two or more dependency trees may have the greatest length. For example, the data retrieval device may identify that a first dependency tree and a second dependency tree, of the dependency trees, are each associated with the longest length among the dependency trees. In such examples, the data retrieval device may determine that the anchor dependency tree includes both the first dependency tree and the second dependency tree. For example, there may be two or more anchor dependency trees. In such examples, the data retrieval device may generate queries in a given iteration for each of the two or more anchor dependency trees in a similar manner as described herein.

Alternatively, the data retrieval device may determine that the anchor dependency tree based on the data sources associated with respective leaf nodes of the dependency trees that are each associated with the longest length. For example, the data retrieval device may identify that a first dependency tree and a second dependency tree, of the dependency trees, are each associated with the longest length among the dependency trees. A first leaf node of the first dependency tree may be associated with a first data source and a second leaf node of the second dependency tree may be associated with a second data source. A first quantity of leaf nodes, of other dependency trees from the dependency trees (e.g., associated with the set of data attributes), may be associated with the first data source and a second quantity of leaf nodes, of the other dependency trees, may be associated with the second data source. The data retrieval device may identify that the first dependency tree is the anchor dependency tree based on the first quantity being greater than the second quantity. In other words, when there are multiple dependency trees associated with the longest length, the data retrieval device may determine that the anchor dependency tree is the dependency tree for which the greatest quantity of data attributes can be requested from the data sources associated with respective leaf nodes of the multiple dependency trees. This may improve an efficiency of the data attribute retrieval process by enabling the data retrieval device to obtain more data attributes during an initial iteration, as described in more detail elsewhere herein.

For example, the data retrieval device may use the anchor dependency tree as an indicator of a data source for a query for a given iteration associated with obtaining the set of data attributes, as described in more detail elsewhere herein. For example, for a given iteration, the data retrieval device may generate a query to the data source indicated by a current leaf node of the anchor dependency tree.

As shown by reference number 125, the data retrieval device may iteratively generate and transmit queries, based on the dependency trees, to retrieve the set of attributes. For example, the data retrieval device may generate, via a set of iterations, queries to respective data sources based on the dependency trees. The respective data sources may be indicated via current leaf nodes of the anchor dependency tree in respective iterations of the set of iterations. For example, each iteration of the set of iterations includes removing data attributes from the dependency trees that have been indicated in prior queries, such that the current leaf node of the anchor dependency tree will be updated in each iteration.

For example, as shown in FIG. 1C, an iteration may include one or more steps or operations. As an example, and as shown by reference number 130, the data retrieval device may determine a data source associated with a current leaf node of the anchor dependency tree. For example, the current leaf node may be associated with a data attribute. A data structure associated with the data attribute may indicate a data source from which the data attribute can be obtained. As an example, the current leaf node of the anchor dependency tree may be associated with the data attribute 10 (e.g., as shown in FIG. 1B). The data attribute 10 may be associated with a data source 4 (e.g., shown as "DS: 4" in FIG. 1B). Therefore, the data retrieval device may determine that the data source associated with the current leaf node of the anchor dependency tree is the data source 4.

As shown by reference number 135, the data retrieval device may determine any matching data attributes in current leaf nodes of remaining dependency trees. For example, a "matching" data attribute may be a data attribute that can be obtained from the same data source as the data attribute associated with the current leaf node of the anchor dependency tree. For example, the data retrieval device may identify data attributes associated with respective leaf nodes of the dependency trees. The data retrieval device may identify whether any of the data attributes are associated with the same data source as the current leaf node of the anchor dependency tree. For example, as shown in FIG. 1B, the current leaf node of the dependency tree 1 may be associated with the data attribute 8, and the current leaf node of the dependency 3 may be associated with the data attribute 7. The data attribute 8 may be associated with the data source 4, and the data attribute 7 may be associated with a data source 2. Therefore, the data retrieval device may determine that, for this iteration, the data attribute 8 is a matching data attribute because the data attribute 7 can be obtained from the same data source (e.g., the data source 4) as the data attribute (e.g., the data attribute 10) associated with the current leaf node of the anchor dependency tree.

As shown by reference number 140, the data retrieval device may generate, for a given iteration, a query to the data source for one or more data attributes. For example, the one or more data attributes may include the data attribute associated with the current leaf node of the anchor dependency tree (e.g., the data attribute 10). Additionally, the one or more data attributes may include any matching data attributes identified by the data retrieval device (e.g., the data attribute 8). The query may indicate any known information needed to obtain the requested data attributes. For example, the query may include an indication of the data attribute 13 (e.g., that is needed to obtain the data attribute 10) and an indication of the data attribute 11 (e.g., that is needed to obtain the data attribute 8).

As shown by reference number 145, the data retrieval device may transmit or provide, to the data source, the query to retrieve the one or more data attributes. For example, the data retrieval device may transmit or provide, to the data source, the query. The data retrieval device may obtain or receive, from the data source and in response to transmitting the query, the one or more data attributes. For example, the data retrieval device may execute the query via a communication, such as an API call. As an example, the communication may indicate the request for the one or more data attributes.

As shown by reference number 150, based on obtaining the one or more data attributes, the data retrieval device may remove the one or more data attributes from respective dependency trees. For example, for a given iteration, the data retrieval device may remove any data attributes, from the set of dependency trees, that were successfully obtained during that iteration. For example, if the data retrieval device transmits a query for a given data attribute during an iteration, but is not able to successfully obtain the given data attribute, then the data retrieval device may not remove the given data attribute from a dependency tree. As an example, the data retrieval device may obtain (e.g., from the data source 4) the data attribute 10 and the data attribute 8 during a first iteration. Therefore, the data retrieval device may remove the data attribute 10 from the dependency tree 2 (e.g., from a stack associated with the dependency tree 2) and the data attribute 8 from the dependency tree 1 (e.g., from a stack associated with the dependency tree 1).

As a result, the current leaf nodes of respective dependency trees may be updated at the end of a given iteration. For example, the data retrieval device may update the current leaf node of the anchor dependency tree to a different node associated with a different data attribute. As an example, the data retrieval device may update the current leaf node and/or the current top position of the anchor dependency tree (e.g., the dependency tree 2) to the data attribute 9 (e.g., as shown in FIG. 1B). As another example, the data retrieval device may update the current leaf node and/or a top position of the dependency tree 1 to the node associated with the data attribute 4.

As shown by reference number 155, the data retrieval device may perform iterations (e.g., a set of iterations) until all dependency trees are empty. In other words, the data retrieval device may repeat the steps or operations associated with an iteration (e.g., as described herein and/or as depicted in FIG. 1C) until all of the requested data attributes (e.g., the set of data attributes indicated by the request, as described in connection with FIG. 1A) have been obtained and/or retrieved. For example, queries generated in a later iteration may be transmitted after queries generated in a prior iteration. This may ensure that the data retrieval device obtains dependent data attributes prior to retrieving other data attributes that depend on the dependent data attributes (e.g., to ensure that the data retrieval device obtains the data attribute 10 prior to attempting to retrieve the data attribute 9).

Figure 1D:
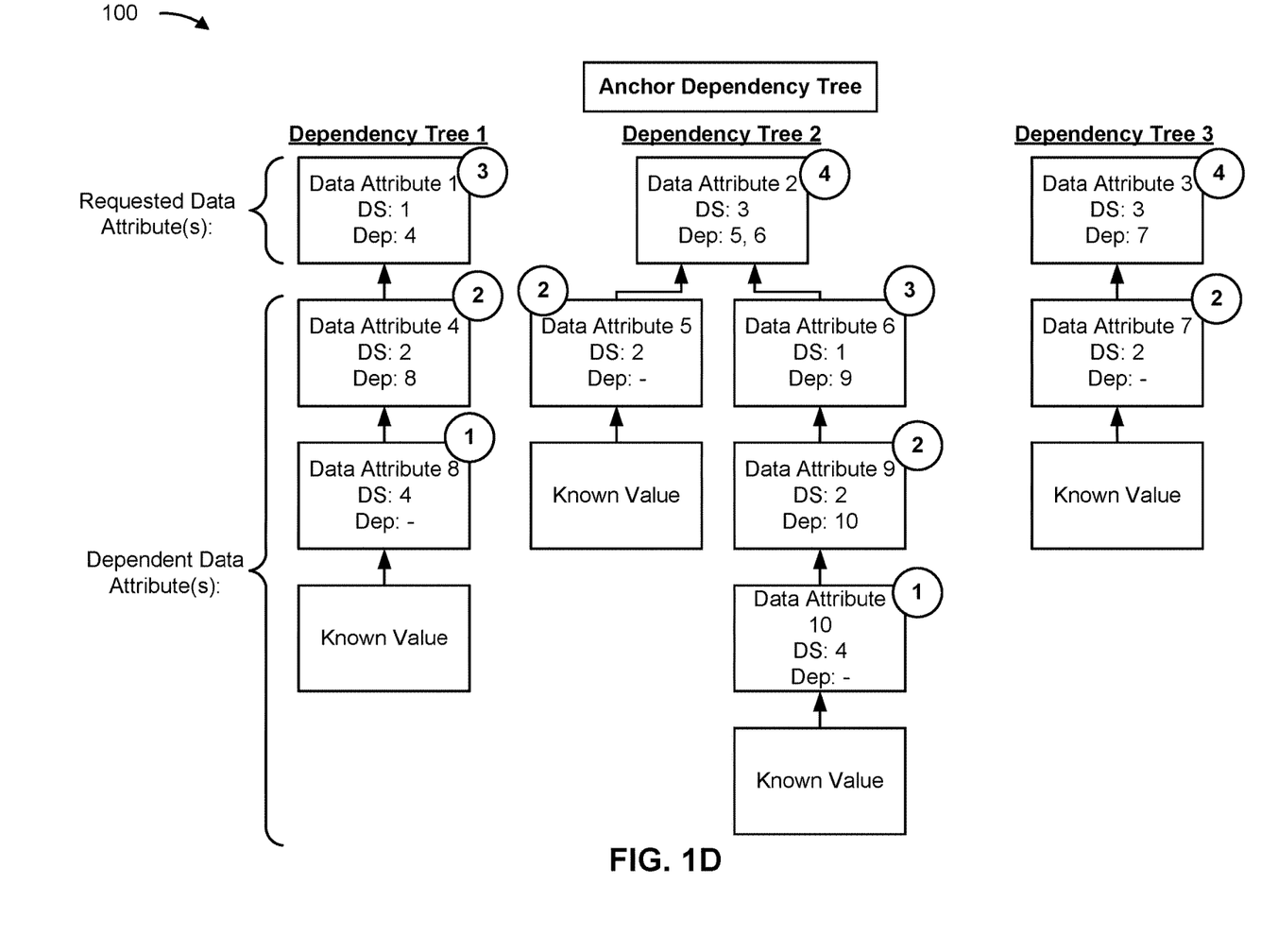

For example, FIG. 1D shows which data attributes may be obtained in respective iterations. For example, during a first iteration, the data attribute 10 and the data attribute 8 may be obtained from the data source 4 (e.g., via a single query and/or API call to the data source 4). During a second iteration, the data attribute 9, the data attribute 4, the data attribute 5, and the data attribute 7 may be obtained from the data source 2 (e.g., via a single query and/or API call to the data source 2). During a third iteration, the data attribute 6 and the data attribute 1 may be obtained from the data source 1 (e.g., via a single query and/or API call to the data source 1). During a fourth iteration, the data attribute 2 and the data attribute 3 may be obtained from the data source 3 (e.g., via a single query and/or API call to the data source 3).

As a result, the data retrieval operation for the set of requested data attributes may be optimized. For example, by using the current leaf node of the dependency tree having the longest length as an indicator of the data source to which the query for that iteration is to be associated with, the data retrieval device may reduce a likelihood of multiple or duplicative communications and/or API calls to the same data source. For example, if the data retrieval device were to generate queries based solely on the current leaf nodes of the dependency trees, then during a first iteration, the data retrieval device may generate and transmit a first query to the data source 4 (e.g., for the data attribute 10 and the data attribute 8) and a generate and transmit a second query to the data source 2 (e.g., for the data attribute 7 and the data attribute 5). During a second iteration, the data retrieval device may generate and transmit a third query to the data source 2 (e.g., for the data attribute 9 and the data attribute 4) and a generate and transmit a fourth query to the data source 3 (e.g., for the data attribute 3). During a third iteration, the data retrieval device may generate and transmit a fifth query to the data source 1 (e.g., for the data attribute 6 and the data attribute 1). During a fourth iteration, the data retrieval device may generate and transmit a sixth query to the data source 2 (e.g., for the data attribute 2). As a result, solely using the current leaf nodes of the dependency trees results in an increased quantity of communications and/or API calls to data sources (e.g., as compared to the approach described herein).

Figure 1E:
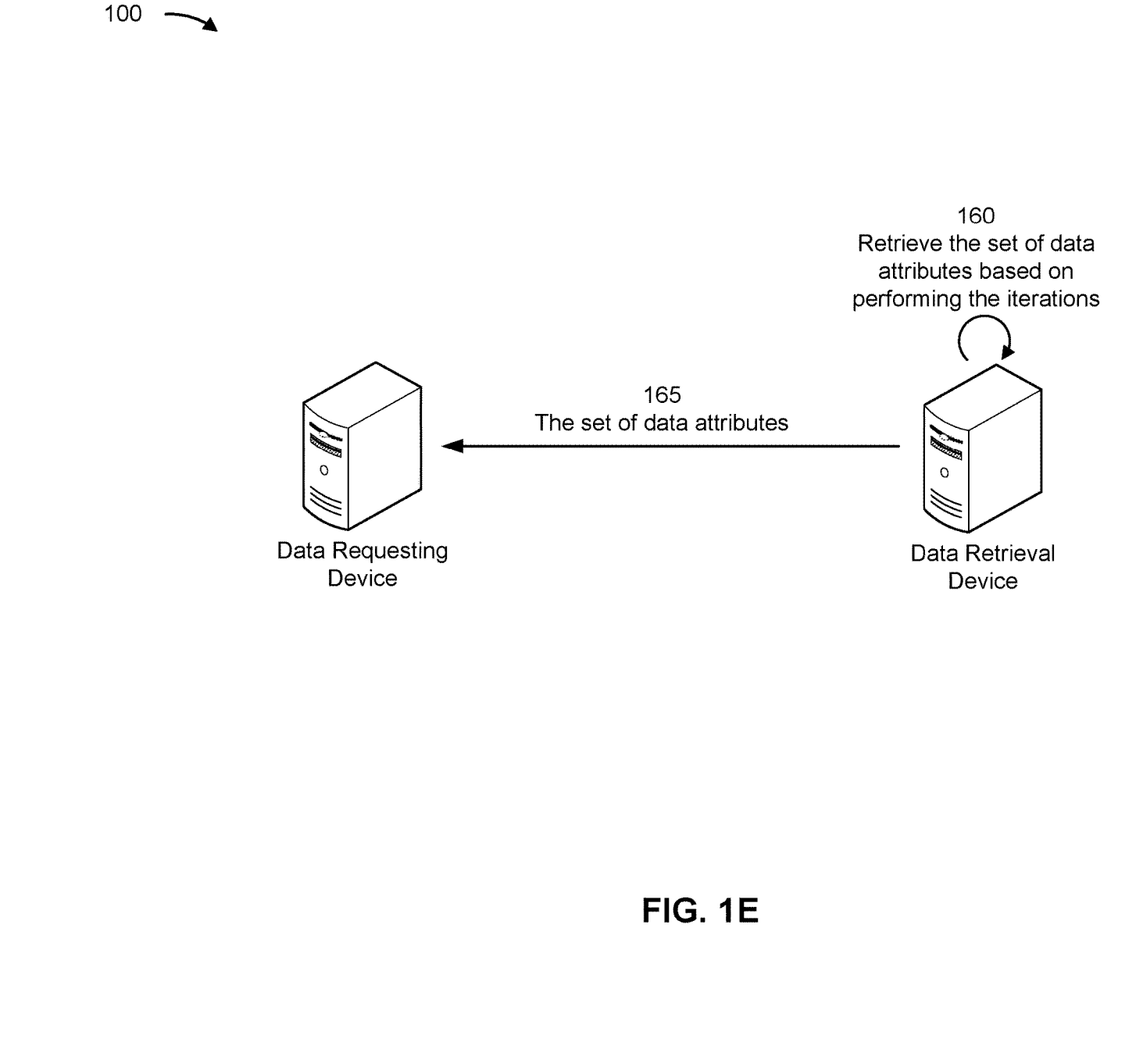

As shown in FIG. 1E, and by reference number 160, the data retrieval device may retrieve the set of data attributes based on performing the iterations described above. The data retrieval device may retrieve, via the respective data sources and based on executing the queries, the set of data attributes, as described in more detail elsewhere herein.

For example, the data retrieval device may retrieve or obtain the set of data attributes based on dependencies associated with the set of data attributes in an efficient manner, thereby conserving processing resources, computing resources, and/or network resources. Additionally, the efficient data retrieval process described herein may reduce the latency associated with retrieving the requested data attributes. As shown by reference number 165, the data retrieval device may transmit or provide, and the data requesting device may receive or obtain, the set of data attributes. For example, the data retrieval device may provide, in response to the request, the set of data attributes.

As indicated above, FIGS. 1A-1E are provided as an example. Other examples may differ from what is described with regard to FIGS. 1A-1E.

Figure 2:
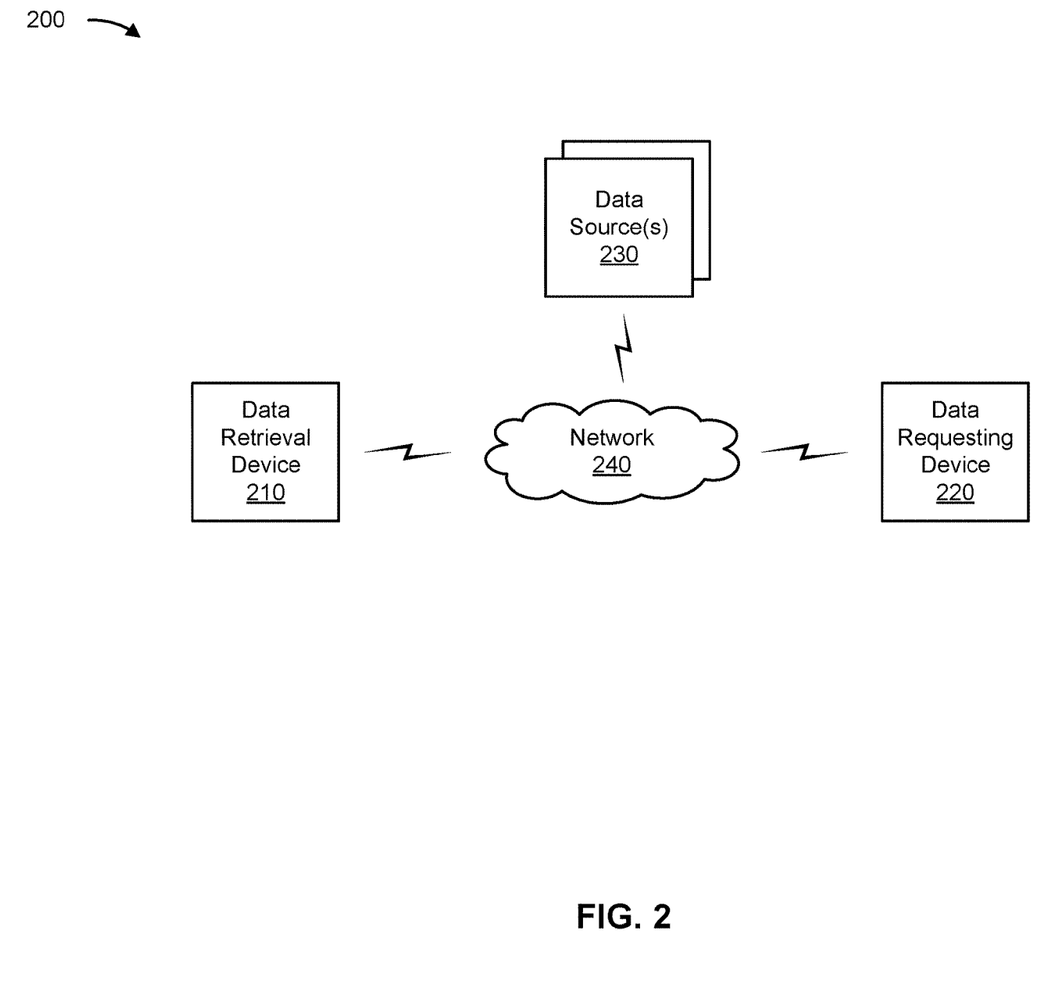
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a data retrieval device 210, a data requesting device 220, one or more data sources 230, and a network 240. Devices of environment 200 may interconnect via wired connections, wireless connections, or a combination of wired and wireless connections.

The data retrieval device 210 may include one or more devices capable of receiving, generating, storing, processing, providing, and/or routing information associated with optimized data attribute retrieval (e.g., using dependency trees), as described elsewhere herein. The data retrieval device 210 may include a communication device and/or a computing device. For example, the data retrieval device 210 may include a server, such as an application server, a client server, a web server, a database server, a host server, a proxy server, a virtual server (e.g., executing on computing hardware), or a server in a cloud computing system. In some implementations, the data retrieval device 210 may include computing hardware used in a cloud computing environment.

The data requesting device 220 may include one or more devices capable of receiving, generating, storing, processing, providing, and/or routing information associated with optimized data attribute retrieval (e.g., using dependency trees), as described elsewhere herein. The data requesting device 220 may include a communication device and/or a computing device. For example, the data requesting device 220 may include a server, such as an application server, a client server, a web server, a database server, a host server, a proxy server, a virtual server (e.g., executing on computing hardware), or a server in a cloud computing system. In some implementations, the data requesting device 220 may include computing hardware used in a cloud computing environment. In some implementations, the data retrieval device 210 and the data requesting device 220 may be included in the same device (e.g., the same server) and/or in the same system. For example, the data retrieval device 210 may be a first component of the device and/or system and the data requesting device 220 may be a second component of the device and/or system. In other implementations, the data retrieval device 210 and the data requesting device 220 may be included in the different devices and/or in different systems.

A data source 230 may include one or more devices capable of receiving, generating, storing, processing, and/or providing information associated with optimized data attribute retrieval (e.g., using dependency trees), as described elsewhere herein. The data source 230 may include a communication device and/or a computing device. For example, the data source 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 230 may communicate with one or more other devices of environment 200, as described elsewhere herein.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
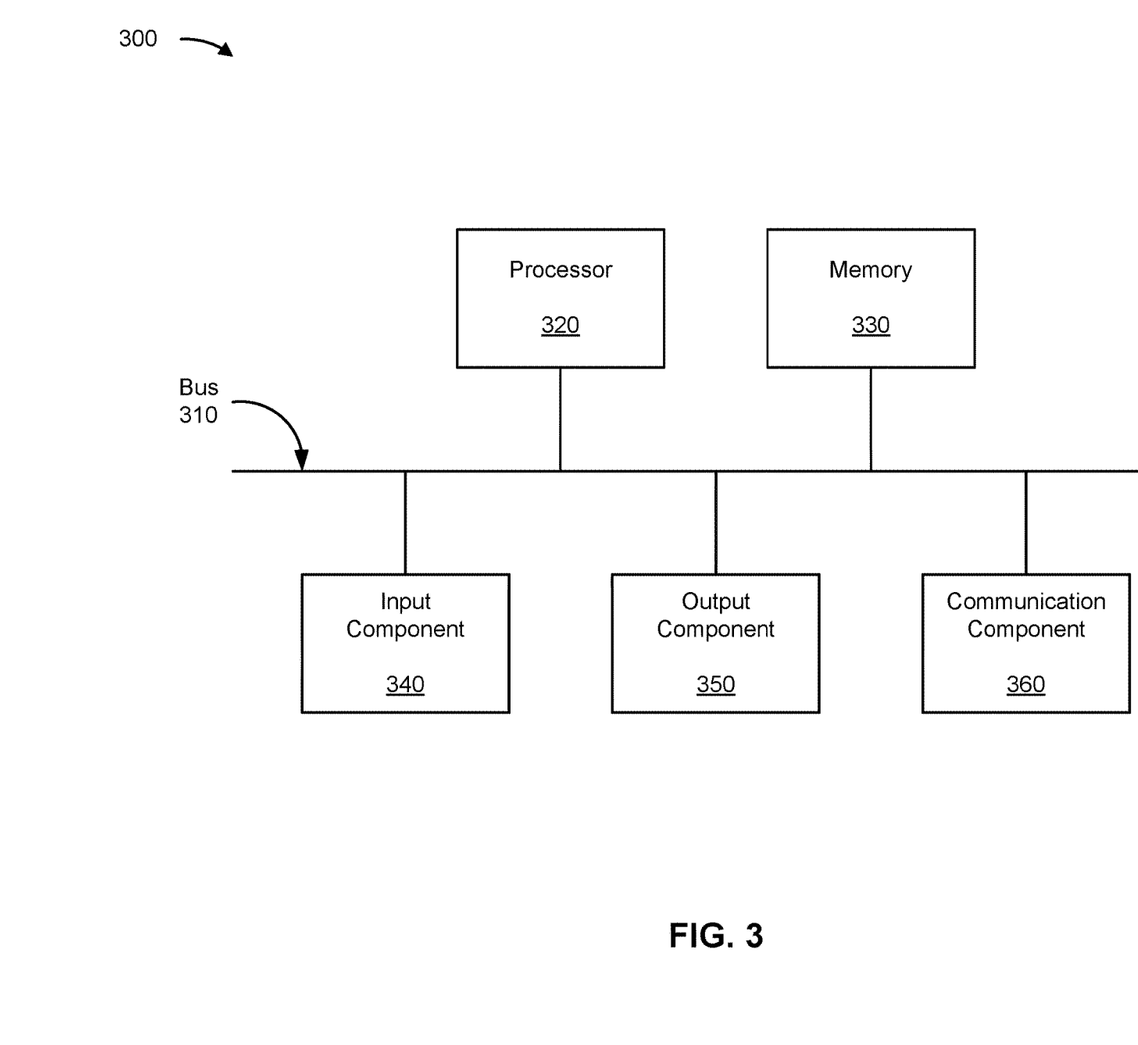
FIG. 3 is a diagram of example components of a device associated with data attribute retrieval, in accordance with some embodiments of the present disclosure.

FIG. 3 is a diagram of example components of a device 300 associated with data attribute retrieval. The device 300 may correspond to the data retrieval device 210, the data requesting device 220, and/or a data source 230. In some implementations, the data retrieval device 210, the data requesting device 220, and/or a data source 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
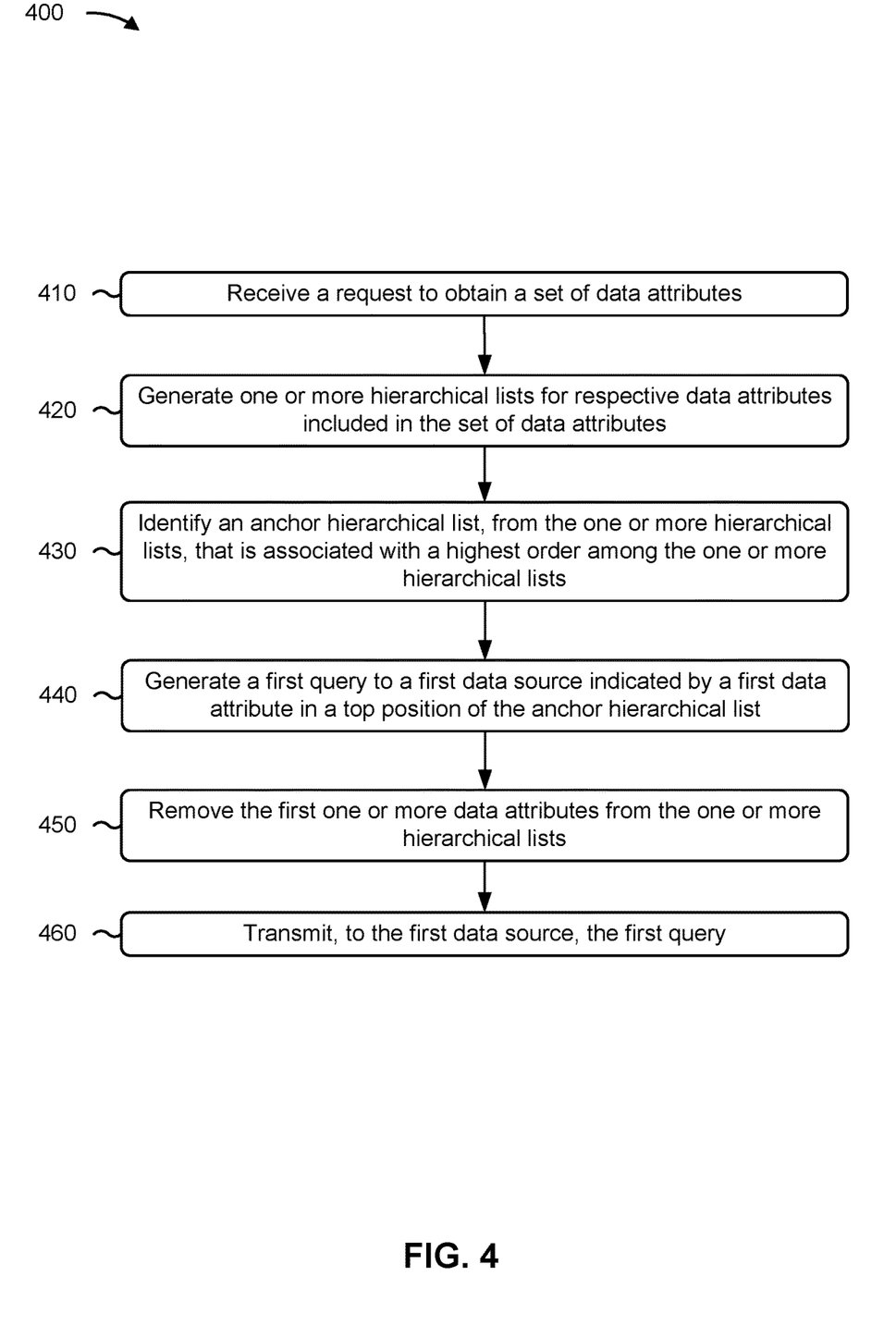
FIG. 4 is a flowchart of an example process associated with data attribute retrieval, in accordance with some embodiments of the present disclosure.

FIG. 4 is a flowchart of an example process 400 associated with data attribute retrieval. In some implementations, one or more process blocks of FIG. 4 may be performed by the data retrieval device 210. In some implementations, one or more process blocks of FIG. 4 may be performed by another device or a group of devices separate from or including the data retrieval device 210, such as the data requesting device 220 and/or one or more data sources 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a request to obtain a set of data attributes (block 410). For example, the data retrieval device 210 (e.g., using processor 320, memory 330, input component 340, and/or communication component 360) may receive a request to obtain a set of data attributes, as described above in connection with reference number 105 of FIG. 1A. As an example, the data retrieval device 210 may receive the request to obtain the set of data attributes from the data requesting device 220.

As further shown in FIG. 4, process 400 may include generating one or more hierarchical lists for respective data attributes included in the set of data attributes (block 420). For example, the data retrieval device 210 (e.g., using processor 320 and/or memory 330) may generate one or more hierarchical lists for respective data attributes included in the set of data attributes, as described above in connection with reference number 110 of FIG. 1A. In some implementations, the one or more hierarchical lists are based on dependencies associated with the set of data attributes. As an example, the one or more hierarchical lists may include one or more dependency trees.

As further shown in FIG. 4, process 400 may include identifying an anchor hierarchical list, from the one or more hierarchical lists, that is associated with a highest order among the one or more hierarchical lists (block 430). For example, the data retrieval device 210 (e.g., using processor 320 and/or memory 330) may identify an anchor hierarchical list, from the one or more hierarchical lists, that is associated with a highest order among the one or more hierarchical lists, as described above in connection with reference number 120 of FIG. 1C. As an example, the data retrieval device 210 may identify a dependency tree that is associated with a greatest quantity of edges from a leaf node to a root node of the dependency tree. The data retrieval device 210 may determine that a hierarchical list, associated with the dependency tree, is the anchor hierarchical list.

As further shown in FIG. 4, process 400 may include generating a first query to a first data source indicated by a first data attribute in a top position of the anchor hierarchical list (block 440). For example, the data retrieval device 210 (e.g., using processor 320 and/or memory 330) may generate a first query to a first data source indicated by a first data attribute in a top position of the anchor hierarchical list, as described above in connection with reference number 140 of FIG. 1C. In some implementations, the first query requests a first one or more data attributes including the first data attribute and any other data attributes, associated with the first data source, that are in top positions of respective hierarchical lists of the one or more hierarchical lists. As an example, the data retrieval device 210 may use the data attribute currently in the top position of the anchor hierarchical list (e.g., a leaf node of the dependency tree associated with the anchor hierarchical list) as an indicator for a data source to which the first query is to be made.

As further shown in FIG. 4, process 400 may include removing the first one or more data attributes from the one or more hierarchical lists (block 450). For example, the data retrieval device 210 (e.g., using processor 320 and/or memory 330) may remove the first one or more data attributes from the one or more hierarchical lists, as described above in connection with reference number 150 of FIG. 1C. As an example, the data retrieval device 210 may remove any data attributes that are request and/or successfully obtained from the one or more hierarchical lists.

As further shown in FIG. 4, process 400 may include transmitting, to the first data source, the first query (block 460). For example, the data retrieval device 210 (e.g., using processor 320, memory 330, and/or communication component 360) may transmit, to the first data source, the first query, as described above in connection with reference number 145 of FIG. 1C. As an example, the data retrieval device 210 may transmit a communication (e.g., a single communication) to the first data source to obtain the first one or more data attributes. The data retrieval device 210 continue to iteratively generate and transmit communications to data sources (e.g., in a similar manner as described in connection with the block 440, the block 450, and the block 460) until the set of data attributes are retrieved. In other words, the block 440, the block 450, and the block 460 may be repeated until the data retrieval device 210 obtains the set of data attributes indicated by the request. The data retrieval device 210 may transmit, and the data requesting device 220 may receive, the set of data attributes.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for data attribute retrieval, the system comprising:
one or more memories; and
one or more processors, communicatively coupled to the one or more memories, configured to:
receive a request to obtain a set of data attributes, wherein a data structure associated with a data attribute of the set of data attributes indicates one or more dependent data attributes that are needed to obtain the data attribute;
generate dependency trees for respective data attributes included in the set of data attributes,
wherein a dependency tree of the dependency trees indicates an ordered list of the one or more dependent data attributes;
identify an anchor dependency tree from the dependency trees,
wherein the anchor dependency tree is associated with a longest length among the dependency trees;
generate, via a set of iterations, queries to respective data sources based on the dependency trees,
wherein the respective data sources are indicated via current leaf nodes of the anchor dependency tree in respective iterations of the set of iterations, and
wherein each iteration of the set of iterations includes removing data attributes from the dependency trees that have been indicated in prior queries;
retrieve, via the respective data sources and based on executing the queries, the set of data attributes; and
provide, in response to receiving the request, the set of data attributes.

2. The system of claim 1, wherein a first leaf node of the anchor dependency tree is associated with a first data attribute, and wherein the one or more processors, to generate the queries, are configured to:
generate a first query to a first data source requesting a first one or more data attributes including the first data attribute and any other data attributes associated with the first data source as indicated by leaf nodes of the dependency trees;
remove, from the dependency trees, the first one or more data attributes;
update a current leaf node, of the anchor dependency tree, to a second leaf node associated with a second data attribute,
wherein the second data attribute is stored by a second data source; and
generate a second query to the second data source to obtain a second one or more data attributes including the second data attribute and any other data attributes associated with the second data source as indicated by the leaf nodes of the dependency trees.

3. The system of claim 2, wherein the one or more processors, to retrieve the set of data attributes, are configured to:

execute the first query to obtain the first one or more data attributes from the first data source; and
execute, after executing the first query, the second query to obtain the second one or more data attributes from the second data source.

4. The system of claim 1, wherein the respective data sources are where data attributes are stored as indicated by the current leaf nodes of the anchor dependency tree during the respective iterations from the set of iterations.

5. The system of claim 1, wherein the one or more processors, to generate the queries, are configured to:
generate, for an iteration of the set of iterations, a query, of the queries, to a data source indicated by a current leaf node associated with the iteration to obtain a data attribute indicated by the current leaf node and to obtain data attributes indicated by leaf nodes of respective dependency trees, of the dependency trees, that are associated with the data source.

6. The system of claim 1, wherein the one or more processors, to identify the anchor dependency tree, are configured to:
identify that a first dependency tree and a second dependency tree, of the dependency trees, are each associated with the longest length among the dependency trees; and
determine that the anchor dependency tree includes both the first dependency tree and the second dependency tree.

7. The system of claim 1, wherein the one or more processors, to identify the anchor dependency tree, are configured to:
identify that a first dependency tree and a second dependency tree, of the dependency trees, are each associated with the longest length among the dependency trees,
wherein a first leaf node of the first dependency tree is associated with a first data source and a second leaf node of the second dependency tree is associated with a second data source, and
wherein a first quantity of leaf nodes, of other dependency trees from the dependency trees, are associated with the first data source and a second quantity of leaf nodes, of the other dependency trees, are associated with the second data source; and
identify that the first dependency tree is the anchor dependency tree based on the first quantity being greater than the second quantity.

8. A method of data attribute retrieval, comprising:
receiving, by a device, a request to obtain a set of data attributes, wherein a data structure associated with a data attribute of the set of data attributes indicates one or more dependent data attributes that are needed to obtain the data attribute;
generating, by the device, one or more hierarchical lists for respective data attributes included in the set of data attributes,
wherein the one or more hierarchical lists are based on dependencies associated with the set of data attributes;
identifying, by the device, an anchor hierarchical list, from the one or more hierarchical lists, that is associated with a highest order among the one or more hierarchical lists;
generating, by the device, a first query to a first data source indicated by a first data attribute in a top position of the anchor hierarchical list,
wherein the first query requests a first one or more data attributes including the first data attribute and any other data attributes, associated with the first data source, that are in top positions of respective hierarchical lists of the one or more hierarchical lists;

removing, by the device, the first one or more data attributes from the one or more hierarchical lists; and transmitting, by the device and to the first data source, the first query.

9. The method of claim 8, further comprising:

generating one or more queries, including the first query, to obtain the set of data attributes based on the one or more hierarchical lists,
wherein the one or more queries are to respective data sources that are based on a storage location of a data attribute currently in the top position of the anchor hierarchical list;

transmitting, to the respective data sources, the one or more queries to obtain the set of data attributes; and transmitting, in response to the request, the set of data attributes.

10. The method of claim 8, wherein generating the first query is part of a first iteration of a set of iterations associated with retrieving the set of data attributes, and
wherein an iteration of the set of iterations comprises:
identifying a data source indicated by a data attribute currently in the top position of the anchor hierarchical list during the iteration;
generating a query to the data source to obtain the data attribute and any other data attributes currently in the top positions of other hierarchical lists, of the one or more hierarchical lists, that are associated with the data source;
transmitting, to the data source, the query; and
removing, from the one or more hierarchical lists, any data attributes retrieved via transmitting the query.

11. The method of claim 10, wherein the set of iterations are associated with generating and transmitting one or more queries, including the first query, until the one or more hierarchical lists are empty.

12. The method of claim 10, wherein a second iteration of the set of iterations is associated with a second query to a second data source,
wherein the second query is associated with obtaining a second data attribute included in the anchor hierarchical list that is positioned after the first data attribute in the anchor hierarchical list, and
wherein the method further comprises:
transmitting, to the second data source and after transmitting the first query, the second query.

13. The method of claim 12, wherein the second query uses the first data attribute retrieved via the first query as an input to the second data source.

14. The method of claim 8, wherein identifying the anchor hierarchical list comprises:
identifying that a first hierarchical list and a second hierarchical list, of the one or more hierarchical lists, are each associated with the highest order;
wherein the first hierarchical list includes the first data attribute,
wherein a second data attribute in a top position of the second hierarchical list is associated with a second data source, and
wherein a first quantity of data attributes, in the top positions of other hierarchical lists, are associated with the first data source, and a second quantity of data attributes, in the top positions of the other hierarchical lists, are associated with the second data source; and identifying that the first hierarchical list is the anchor hierarchical list based on the first quantity being greater than the second quantity.

15. The method of claim 14, wherein generating the first query is part of a first iteration of a set of iterations associated with retrieving the set of data attributes, and
wherein, during a second iteration of the set of iterations, the second hierarchical list is the anchor hierarchical list.

16. The method of claim 8, wherein the one or more hierarchical lists include one or more dependency trees.

17. A non-transitory computer-readable medium storing a set of instructions, the set of instructions comprising:
one or more instructions that, when executed by one or more processors of a device, cause the device to:
receive a request to obtain a set of data attributes, wherein a data structure associated with a data attribute of the set of data attributes indicates one or more dependent data attributes that are needed to obtain the data attribute;
generate one or more hierarchical lists for respective data attributes included in the set of data attributes;
identify an anchor hierarchical list, from the one or more hierarchical lists, that is associated with a highest order among the one or more hierarchical lists;
generate a first query to a first data source indicated by a first data attribute in a top position of the anchor hierarchical list,
wherein the first query requests a first one or more data attributes including the first data attribute and any other data attributes, associated with the first data source, that are in top positions of respective hierarchical lists of the one or more hierarchical lists;
remove the first one or more data attributes from the one or more hierarchical lists; and
transmit, to the first data source, the first query.

18. The non-transitory computer-readable medium of claim 17, wherein generating the first query is part of a first iteration of a set of iterations associated with retrieving the set of data attributes, and
wherein, for an iteration of the set of iterations, the one or more instructions cause the device to:
identify a data source indicated by a data attribute currently in the top position of the anchor hierarchical list during the iteration;
generate a query to the data source to obtain the data attribute and any other data attributes currently in the top positions of other hierarchical lists, of the one or more hierarchical lists, that are associated with the data source;
transmit, to the data source, the query; and
remove, from the one or more hierarchical lists, any data attributes retrieved via transmitting the query.

19. The non-transitory computer-readable medium of claim 18, wherein the set of iterations are associated with generating and transmitting one or more queries, including the first query, until the one or more hierarchical lists are empty.

20. The non-transitory computer-readable medium of claim 17, wherein generating the first query is part of a first iteration of a set of iterations associated with retrieving the set of data attributes,
wherein, during the first iteration, a first hierarchical list, of the one or more hierarchical lists, is the anchor hierarchical list, and wherein, during a second iteration of the set of iterations, a second hierarchical list, of the one or more hierarchical lists, is the anchor hierarchical list.

\* \* \* \* \*